US012781004B2

(12) United States Patent
Ohira et al.

(10) Patent No.: US 12,781,004 B2
(45) Date of Patent: Nov. 3, 2026

(54) METHOD FOR MANUFACTURING GAS DIFFUSION LAYER FOR FUEL CELL AND GAS DIFFUSION LAYER FOR FUEL CELL

(71) Applicants: TOYOTA BOSHOKU KABUSHIKI KAISHA, Aichi-ken (JP); AICHI UNIVERSITY OF EDUCATION, Aichi (JP); Nobuyuki Nishi, Ishikawa (JP)

(72) Inventors: Junko Ohira, Kariya (JP); Masaaki Takemoto, Kariya (JP); Shigetomi Honda, Kariya (JP); Kazuyuki Hino, Nagoya (JP); Nobuyuki Nishi, Kanazawa (JP)

(73) Assignees: TOYOTA BOSHOKU KABUSHIKI KAISHA, Aichen-Ken (JP); AICHI UNIVERSITY OF EDUCATION, Aichi (JP); Nobuyuki Nishi, Ishikawa (JP)

( * ) Notice: Subject to any disclaimer, the term of this patent is extended or adjusted under 35 U.S.C. 154(b) by 417 days.

(21) Appl. No.: 18/614,995

(22) Filed: Mar. 25, 2024

(65) Prior Publication Data

US 2024/0327583 A1 Oct. 3, 2024

(30) Foreign Application Priority Data

Mar. 28, 2023 (JP) ................................ 2023-052312

(51) Int. Cl.

| | |
|---|---|
| ***C08J 5/22*** | (2006.01) |
| ***C08K 3/04*** | (2006.01) |
| ***H01M 4/88*** | (2006.01) |
| ***H01M 8/0234*** | (2016.01) |
| ***H01M 8/0245*** | (2016.01) |
| ***H01M 8/1004*** | (2016.01) |

(52) U.S. Cl.

CPC ............. *C08J 5/2206* (2013.01); *C08K 3/042* (2017.05); *H01M 4/8807* (2013.01); *H01M 8/0234* (2013.01); *H01M 8/0245* (2013.01); *C08J 2300/00* (2013.01); *H01M 8/1004* (2013.01)

(58) Field of Classification Search

None

See application file for complete search history.

(56) References Cited

U.S. PATENT DOCUMENTS

2012/0295108 A1 * 11/2012 Nishi .................... B82Y 30/00 977/734

FOREIGN PATENT DOCUMENTS

JP 2022-42074 3/2022

* cited by examiner

*Primary Examiner* — Eli S Mekhlin

(74) *Attorney, Agent, or Firm* — GREENBLUM & BERNSTEIN, P.L.C.

(57) ABSTRACT

A method for manufacturing a gas diffusion layer for a fuel cell includes agitating a solution containing a precursor to form wire-shaped structures of the precursor and entangle the wire-shaped structures in the solution, adding the precursor to a surface layer portion of a porous base sheet or a base sheet precursor so as to fill pores in the surface layer portion, and calcining the base sheet or the base sheet precursor and the precursor in a range of 1000° C. to 1200° C., thereby forming a porous carbon that is composed of multilayer cavity walls of graphene and has mesoporosity and a hollow wire-shaped crystal structure.

5 Claims, 9 Drawing Sheets

METHOD FOR MANUFACTURING GAS DIFFUSION LAYER FOR FUEL CELL AND GAS DIFFUSION LAYER FOR FUEL CELL

BACKGROUND

1. Field

The present disclosure relates to a method for manufacturing a gas diffusion layer for a fuel cell and to a gas diffusion layer for a fuel cell.

2. Description of Related Art

A polymer electrolyte fuel cell includes a fuel cell stack formed by stacking multiple single cells. Each single cell includes a membrane electrode assembly that includes a solid polymer electrolyte membrane (hereinafter, referred to as "electrolyte membrane") and two catalyst layers sandwiching the electrolyte membrane, two gas diffusion layers sandwiching the membrane electrode assembly, an anode-side separator, and a cathode-side separator. The anode-side separator and the cathode-side separator sandwich the two gas diffusion layers.

As such a gas diffusion layer, Japanese Laid-Open Patent Publication No. 2022-42074 discloses a gas diffusion electrode. The gas diffusion electrode disclosed in this publication includes a sheet-shaped porous base and a microporous layer disposed in contact with one surface of the porous base. Examples of the porous base include carbon paper, carbon cloth, and carbon nonwoven fabric. The microporous layer is formed by coating one surface of the porous base with a paste-like coating liquid in which conductive fine particles, a binder, a solvent, a thickener, and the like are mixed and dispersed. The conductive particles are carbon black such as acetylene black having an average particle size in a range of 20 nm to 150 nm. The binder is, for example, polytetrafluoroethylene (PTFE).

There is a demand for such gas diffusion layers for fuel cells to be manufacturable by a simple method. In addition, there is a demand for further improvement of gas diffusion layers for fuel cells in regard to conductivity, gas diffusibility, and adjustment of water retention amount.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for manufacturing a gas diffusion layer for a fuel cell is provided. The method includes agitating a solution containing copper methylacetylide as a precursor to form wire-shaped structures of the precursor and entangle the wire-shaped structures in the solution, adding the precursor to a surface layer portion of a porous base sheet or a base sheet precursor so as to fill pores in the surface layer portion, and calcining the base sheet or the base sheet precursor and the precursor in a range of 1000° C. to 1200° C. to grow multilayer cavity walls of graphene and thermally remove copper, thereby forming a porous carbon that is composed of multilayer cavity walls of graphene and has mesoporosity and a hollow wire-shaped crystal structure.

In another general aspect, a method for manufacturing a gas diffusion layer for a fuel cell is provided. The method includes agitating a solution containing copper methylacetylide as a precursor to form wire-shaped structures of the precursor and entangle the wire-shaped structures in the solution, calcining the precursor in a range of 1000° C. to 1200° C. to grow multilayer cavity walls of graphene and thermally remove copper, thereby forming a porous carbon that is composed of multilayer cavity walls of graphene and has mesoporosity and a hollow wire-shaped crystal structure, pulverizing the porous carbon while maintaining the crystal structure, adding the porous carbon to a surface layer portion of a porous base sheet by applying or spraying a solution containing the pulverized porous carbon to the surface layer portion, thereby filling pores in the surface layer portion, and calcining the base sheet and the porous carbon to integrate the porous carbon with the base sheet.

In a further general aspect, a gas diffusion layer for a fuel cell includes a porous base sheet and a porous carbon that is integrally formed with the base sheet so as to fill pores in a surface layer portion of the base sheet. The porous carbon is composed of multilayer cavity walls of graphene and includes a structure in which hollow wire-shaped crystals having mesoporosity are entangled. Wire diameters of the crystals are in a range of 100 nm to 500 nm. Diameters of pores formed by the entangled crystals are in a range of 10 nm to 200 nm.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A gas diffusion layer for a fuel cell and a method for manufacturing a gas diffusion layer for a fuel cell according to a first embodiment will now be described with reference to FIGS. 1 to 12, 17, and 18.

A polymer electrolyte fuel cell includes a fuel cell stack formed by stacking multiple single cells 10.

Figure 1:
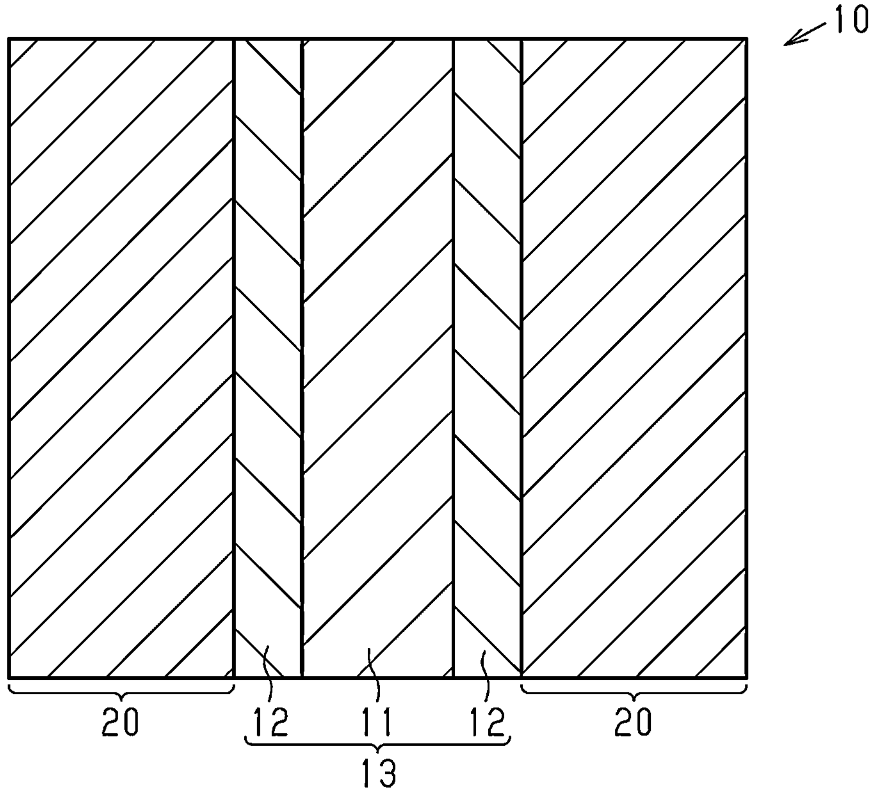
FIG. 1 is a cross-sectional view of a single cell of a fuel cell.

As shown in FIG. 1, each single cell 10 includes a membrane electrode assembly 13, two gas diffusion layers 20 sandwiching the membrane electrode assembly 13, an anode-side separator (not shown), and a cathode-side separator (not shown). The separators sandwich the two gas diffusion layers 20. The membrane electrode assembly 13 includes a solid polymer electrolyte membrane (hereinafter, referred to as an electrolyte membrane 11) and two catalyst layers 12 sandwiching the electrolyte membrane 11.

Figure 2:
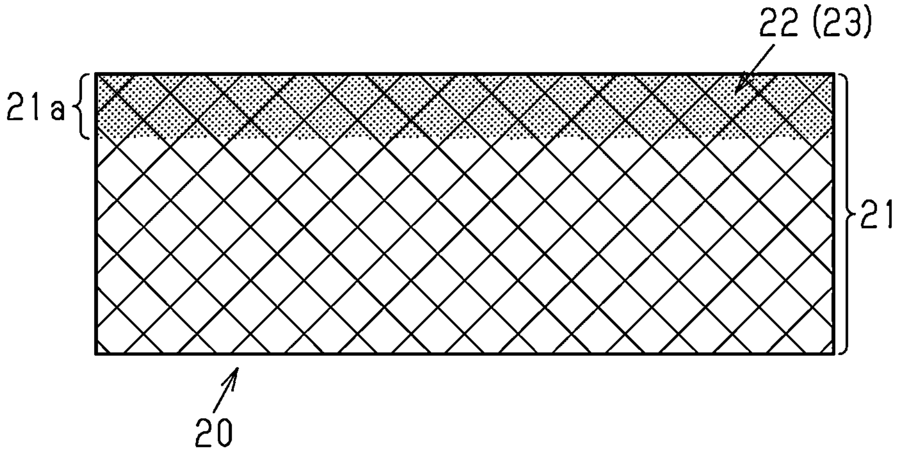
FIG. 2 is a cross-sectional view schematically showing a gas diffusion layer according to a first embodiment.

As shown in FIGS. 1 and 2, the gas diffusion layer 20 includes a porous base sheet 21 and porous carbon 22, which is formed integrally with the base sheet 21 so as to fill pores in a surface layer portion 21*a* of the base sheet 21.

The base sheet 21 of the present embodiment is a carbon cloth having a fiber diameter of about 7 μm and pores of about 1 to 2 μm.

As shown in FIGS. 3 to 8, the porous carbon 22 is composed of multilayer cavity walls of graphene and includes a structure in which hollow wire-shaped crystals having mesoporosity are entangled.

Figure 3:
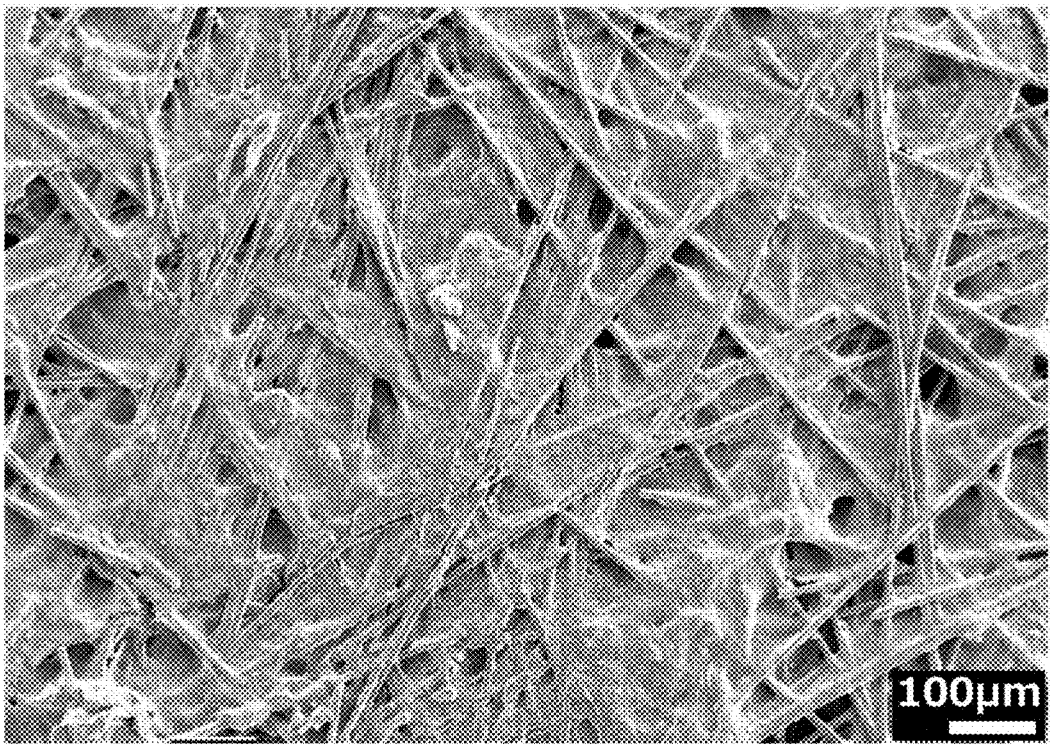
FIG. 3 is an SEM image of a surface layer portion of the gas diffusion layer according to the first embodiment.
Figure 4:
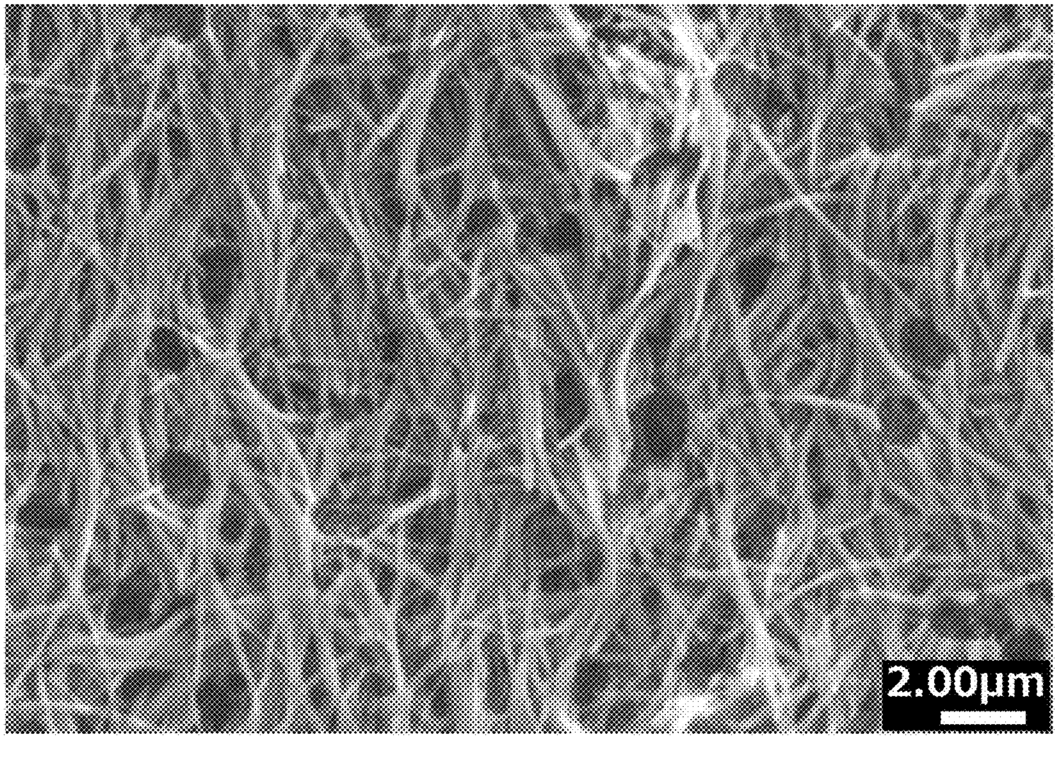
FIG. 4 is an SEM image of the surface layer portion of the gas diffusion layer according to the first embodiment.
Figure 5:
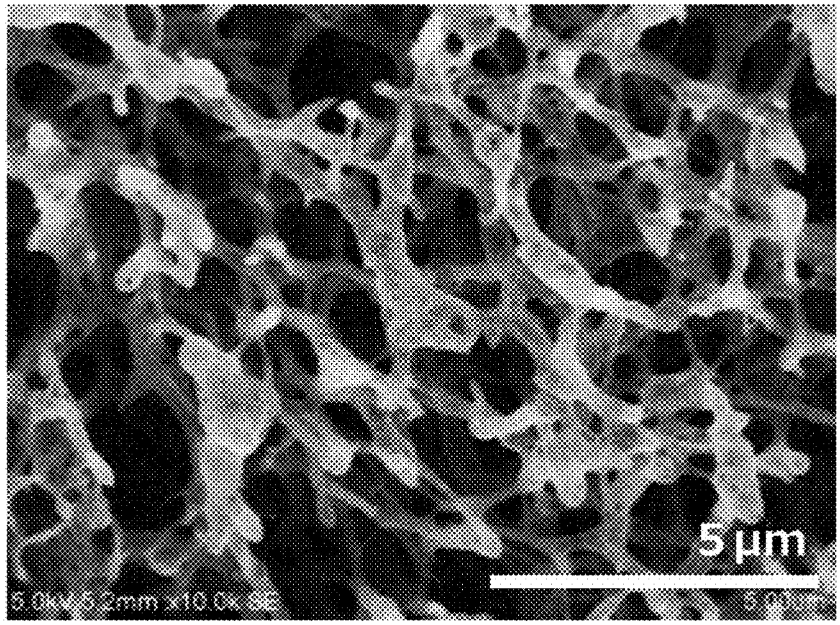
FIG. 5 is an SEM image of porous carbon forming the gas diffusion layer according to the first embodiment.
Figure 6:
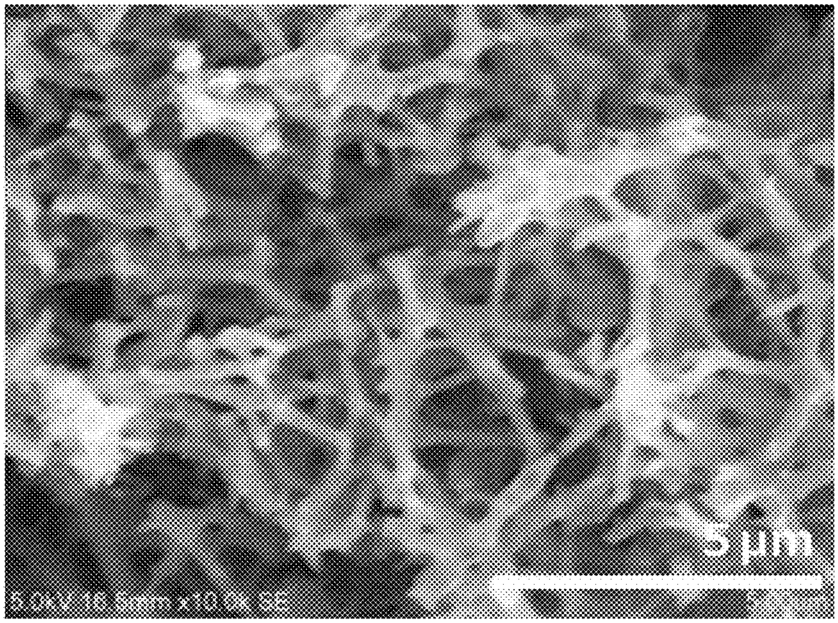
FIG. 6 is an SEM image of the porous carbon forming the gas diffusion layer according to the first embodiment.
Figure 7:
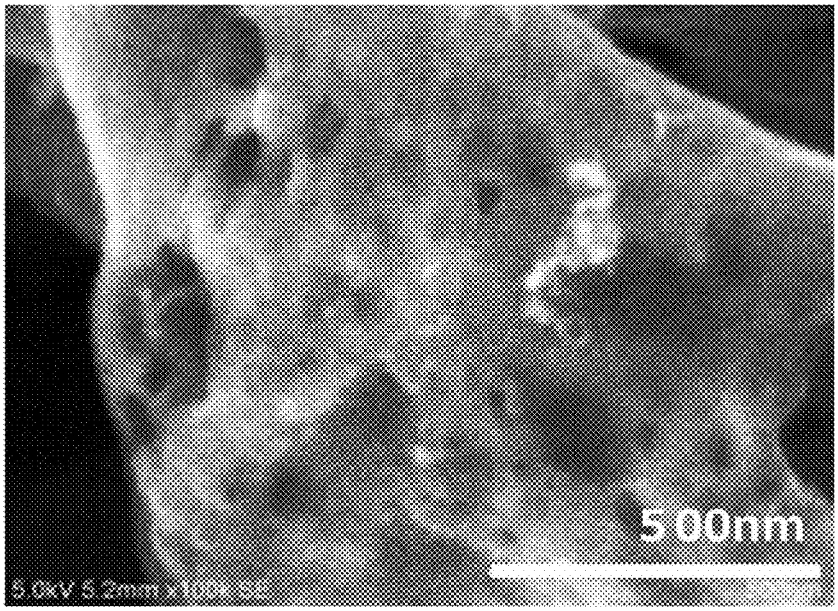
FIG. 7 is an SEM image of the porous carbon forming the gas diffusion layer according to the first embodiment.
Figure 8:
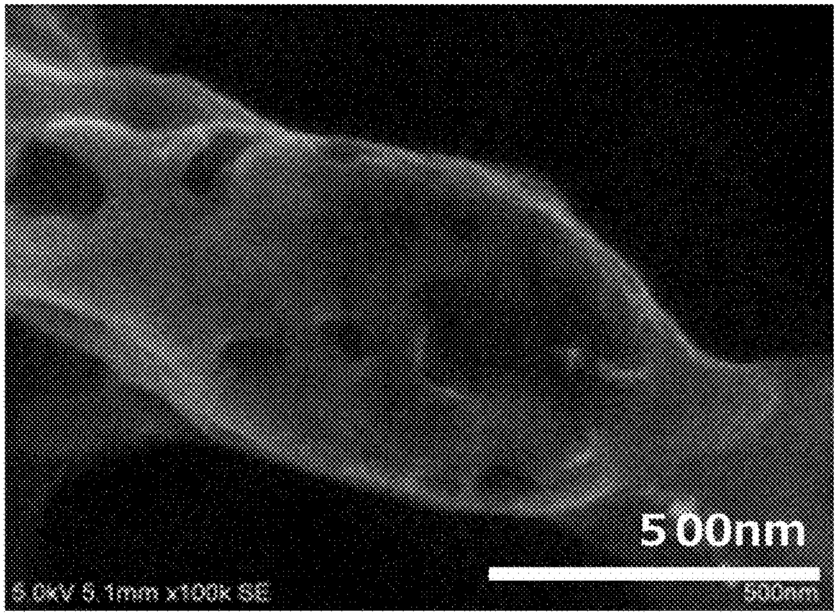
FIG. 8 is an SEM image of the porous carbon forming the gas diffusion layer according to the first embodiment.

As shown in FIG. 3, pores formed between carbon fibers of base sheet 21, i.e., thick fibers, are filled with the porous carbon 22.

Figure 9:
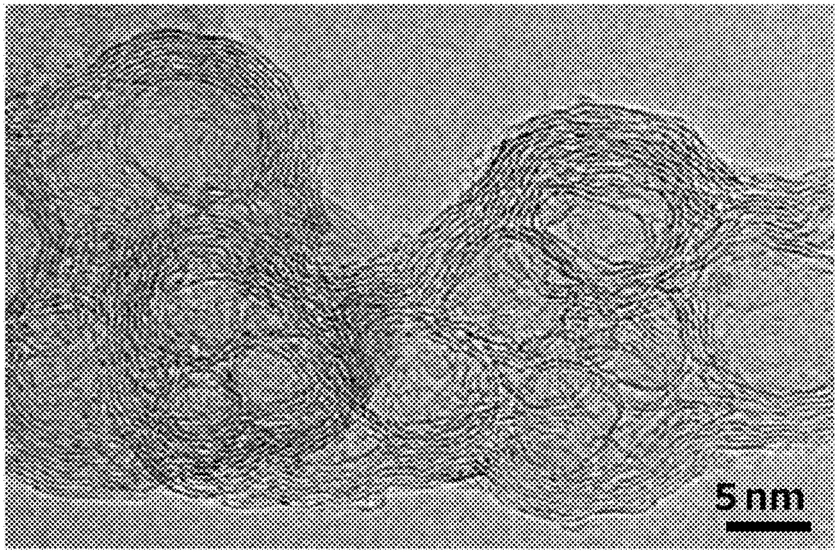
FIG. 9 is a TEM image of the porous carbon forming the gas diffusion layer according to the first embodiment.

As shown in FIG. 9, the porous carbon 22 has a pore structure partitioned by multilayer cavity walls of graphene.

The wire diameters of the crystals are in a range of 100 nm to 500 nm. The diameters of pores formed by the entangled crystals are in a range of 10 nm to 200 nm.

Next, a manufacturing procedure of the gas diffusion layer 20 of the present embodiment will be described with reference to FIG. 11.

Figure 11:
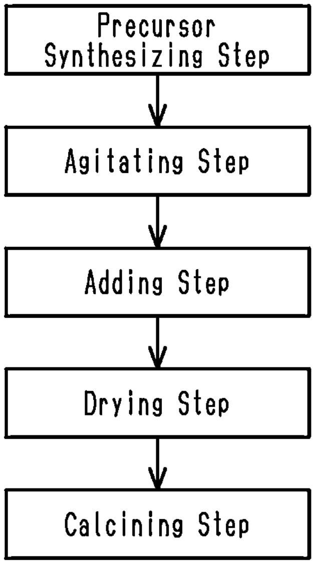
FIG. 11 is a flowchart showing a manufacturing procedure of the gas diffusion layer according to the first embodiment.

As shown in FIG. 11, the method for manufacturing the gas diffusion layer 20 of the present embodiment includes a precursor synthesizing step, an agitating step, an adding step, a drying step, and a calcining step.

The precursor synthesizing step is a step for synthesizing copper methylacetylide as a precursor by a known method.

The agitating step is a step for agitating a solution containing copper methylacetylide as a precursor to form wire-shaped structures, and to entangle the wire-shaped structures in the solution. Water is used as solvent. Adding a small amount of ethanol to the solvent facilitate stretching of the precursor.

In the agitating step, the wire-shaped structures of the precursor are formed by agitating the solution containing copper methylacetylide. At this time, in the subsequent heating step, the copper becomes spherical or elliptical due to the difference in specific gravity between copper and carbon, and the carbon becomes wires covering the copper. In addition, the wire-shaped structures of the precursor are entangled in the solution.

Figure 12:
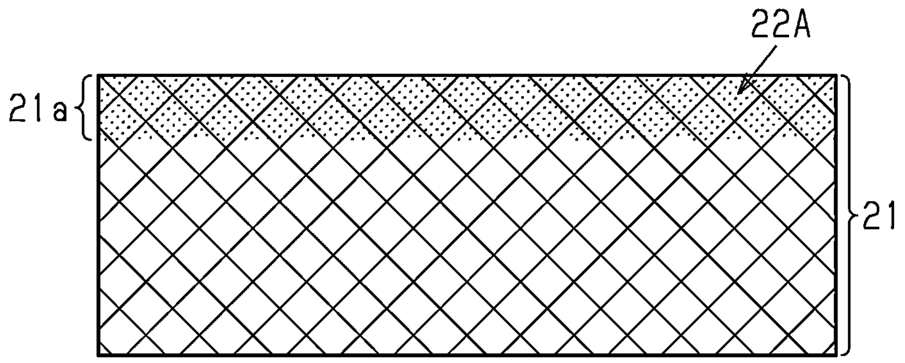
FIG. 12 is a schematic diagram showing a base sheet to which a solution containing a precursor has been applied.

As shown in FIG. 12, the adding step is a step for adding a precursor 22A to the surface layer portion 21*a* of the porous base sheet 21 so as to fill the pores in the surface layer portion 21*a*.

In the adding step, the precursor 22A is added to the surface layer portion 21*a* by applying or spraying a solution containing the precursor 22A to the surface layer portion 21*a*. In the present embodiment, the phenol resin solution containing the precursor 22A is applied to the surface layer portion 21*a* of the base sheet 21, so that the solution penetrates into the pores in the surface layer portion 21*a* of the base sheet 21.

The drying step is a step for heating the precursor 22A added to the surface layer portion 21*a* of the base sheet 21 to a temperature in a range of 170° C. to 300° C. under vacuum to dry the precursor 22A. Accordingly, although phase separation of copper and carbon occurs, the shape of the precursor 22A is readily maintained.

Figure 10:
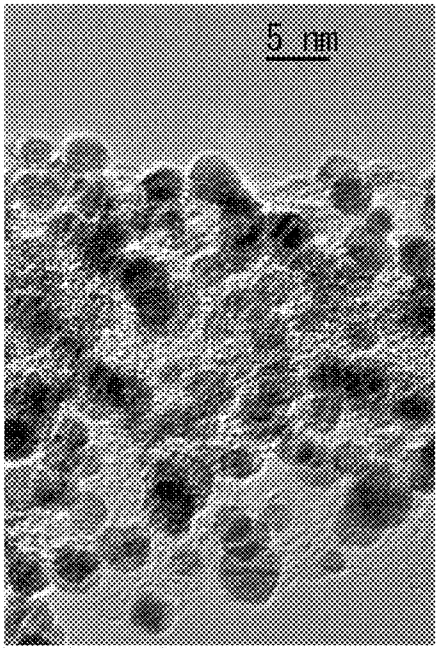
FIG. 10 is a TEM image of a precursor during a drying step according to the first embodiment.

FIG. 10 shows the separation of copper and methylacetylene polymer during the heating process of the precursor 22A to a temperature in a range of 60° C. to 200° C. in the drying step. Specifically, FIG. 10 shows how copper becomes spherical and methyl groups are released as methane and ethylene gas to the outside of the system.

The calcining step is a step for calcining the base sheet 21 and the precursor 22A in a range of 1000° C. to 1200° C. to grow multilayer cavity walls of graphene and thermally remove copper so as to form a porous carbon 22.

The calcining step is preferably performed under a pressure lower than normal pressure.

In the calcining step, the precursor 22A is calcined in a range of 1000° C. to 1200° C. together with the base sheet 21 so as to sublimate and remove copper. The copper in contact with a portion of the carbon of the precursor 22A melts at a temperature higher than or equal to 1000° C. At this time, an ideal two-dimensional surface of carbon is generated due to surface tension generated in the carbon, so that the carbon grows into multilayer cavity walls of graphene. This forms the porous carbon 22 that is composed of multilayer cavity walls of graphene and includes a structure in which hollow wire-shaped crystals having mesoporosity are entangled.

The melting point of copper is 1085° C. However, in a case of particles of sizes less than or equal to 50 nm, liquefaction of copper proceeds at 1000° C. or less due to the depression of melting point.

Figure 17:
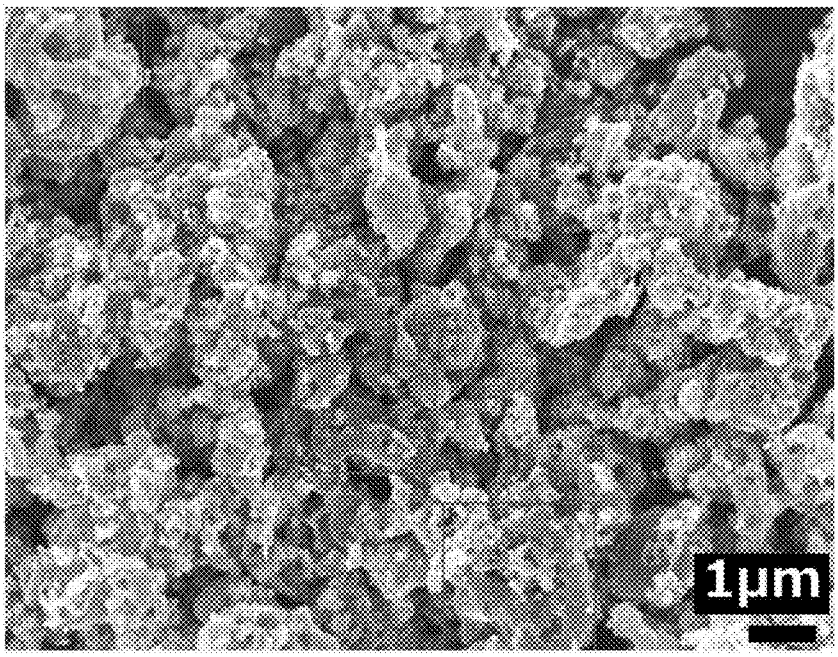
FIG. 17 is an SEM image of porous carbon of a comparative example.
Figure 18:
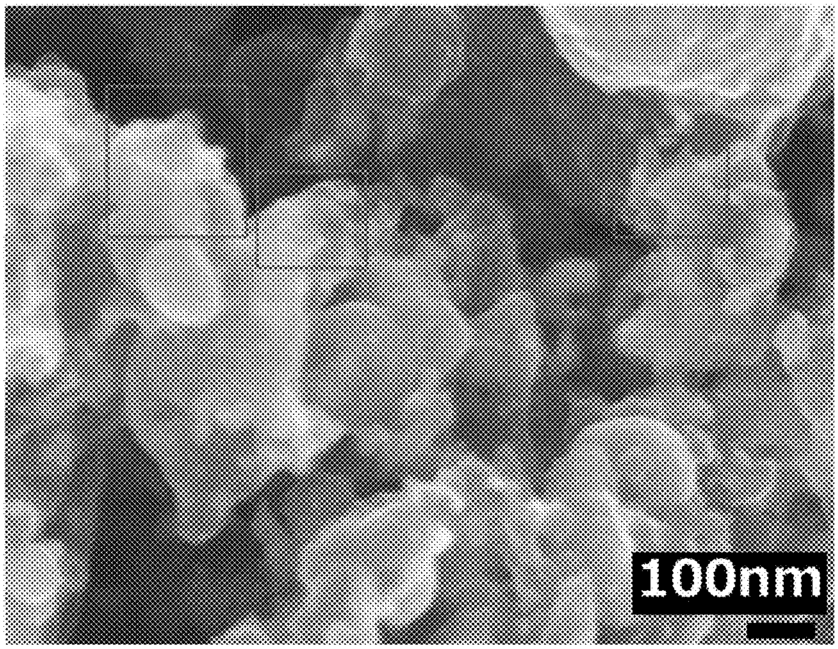
FIG. 18 is an SEM image of the porous carbon of the comparative example.

FIGS. 17 and 18 show SEM images of porous carbon of a comparative example. The porous carbon of the comparative example was formed by performing vacuum calcination while dropping the precursor of the present embodiment into a furnace.

The present embodiment has the following advantages.

(1-1) The method for manufacturing the gas diffusion layer 20 includes the agitating step, the adding step, and the calcining step.

With this method, since the calcining temperature is in a range of 1000° C. to 1200° C., the calcining temperature is lowered as compared with, for example, a conventional manufacturing method in which silver methylacetylide is calcined at 2000° C. This allows the size of the calcining furnace and the energy required for calcination to be reduced.

In addition, copper is preferable to silver in order to grow thick multilayer cavity walls of graphene so as to increase conductivity.

Accordingly, the above-described method enables the acquisition of the gas diffusion layer 20, in which the pores of the surface layer portion 21*a* of the base sheet 21 are filled with the porous carbon 22, through simple steps. The porous carbon 22 functions as a microporous layer 23. Therefore, the gas diffusion layer 20 having the microporous layer 23 can be manufactured by a simple method.

(1-2) In the adding step, the precursor 22A is added to the surface layer portion 21*a* by applying or spraying a solution containing the precursor 22A to the surface layer portion 21*a*.

With this method, the precursor 22A is added to the surface layer portion 21*a* by applying or spraying a solution containing the precursor 22A to the surface layer portion 21*a* in the adding step. Accordingly, the precursor 22A is readily added to the surface layer portion 21*a* of the porous base sheet 21 so as to fill the pores in the surface layer portion 21*a*.

(1-3) The gas diffusion layer 20 includes the porous base sheet 21 and the porous carbon 22, which is formed integrally with the base sheet 21 so as to fill the pores in the surface layer portion 21*a* of the base sheet 21. The porous carbon 22 is composed of multilayer cavity walls of graphene and includes a structure in which hollow wire-shaped crystals having mesoporosity are entangled. The wire diameters of the crystals are in a range of 100 nm to 500 nm, and the diameters of the pores formed by the entangled crystals are in a range of 10 nm to 200 nm.

Since the porous carbon 22 is formed integrally with the base sheet 21, this configuration increases the rigidity of the porous carbon 22, although the porous carbon 22 itself is brittle. Also, since the porous carbon 22 is composed of multilayer cavity walls of graphene, the porous carbon 22 has a high conductivity. In addition, the wire diameters of the crystals are in a range of 100 nm to 500 nm, and the diameters of pores formed by the entangled crystals are in a range of 10 nm to 200 nm. The porous carbon 22 thus has a high gas diffusibility. Since water can be stored in and discharged from a great number of mesopores in the crystals, the porous carbon 22 is excellent in adjusting the water retention amount. The porous carbon 22 thus functions as the microporous layer 23. In a fuel cell, when protons move from the anode to the cathode, water functions as a carrier for transporting the protons. As described above, since the porous carbon 22 of the gas diffusion layer 20 is adjacent to the catalyst layer 12, the humidity of the catalyst layer 12 is regulated by the porous carbon 22. As a result, the amount of water in the catalyst layer 12 can be increased, which contributes to an improvement in the output of the fuel cell.

Second Embodiment

A second embodiment will now be described with reference to FIGS. 13 and 14. Differences from the first embodiment will mainly be discussed.

Figure 13:
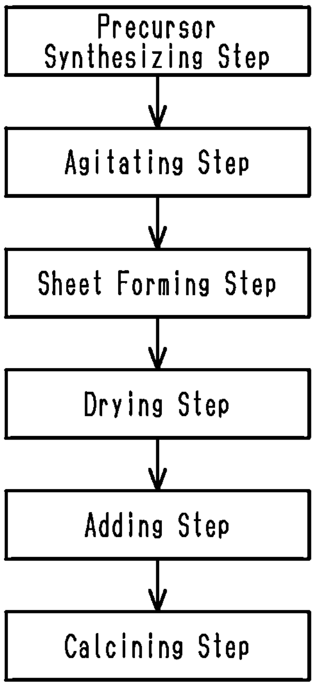
FIG. 13 is a flowchart showing a manufacturing procedure of a gas diffusion layer according to a second embodiment.

As shown in FIG. 13, the method for manufacturing the gas diffusion layer 20 according to the present embodiment is different from the first embodiment in that a sheet forming step and a drying step are provided between the agitating step and the adding step.

The sheet forming step is a step for forming the precursor 22A into a sheet-shaped precursor.

In the sheet forming step, the wire-shaped structures of the precursor 22A, which are entangled, are formed into a sheet-shaped precursor. Examples of the method for forming the wire-shaped structures of the precursor 22A into a sheet-shaped precursor include a method of filtering a solution containing the precursor 22A with filter paper to form a sheet on the filter paper, a method of applying the solution to a planar jig, and a method of spraying the solution onto a planar jig.

The drying step is a step for heating the sheet-shaped precursor to a temperature in a range of 170° C. to 300° C. under vacuum to dry the precursor. Accordingly, although phase separation of copper and carbon occurs, the shape of the precursor is readily maintained.

Figure 14:
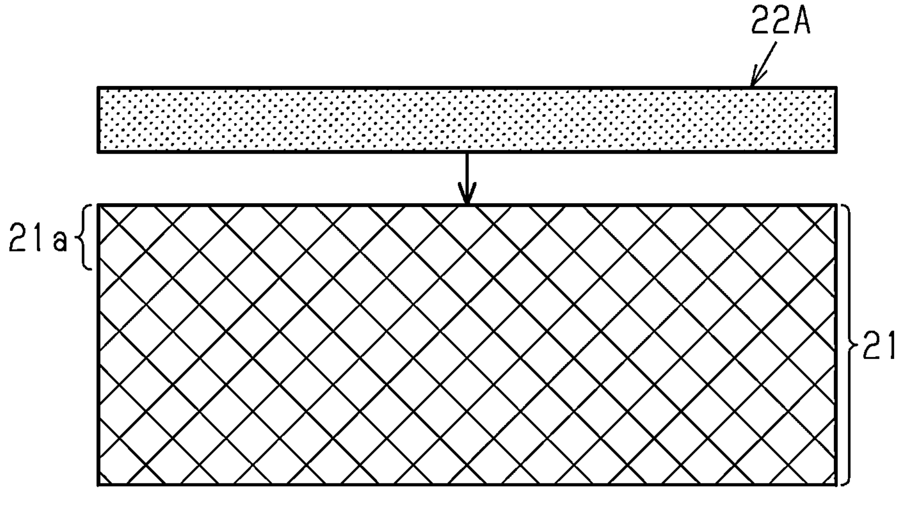
FIG. 14 is a schematic diagram showing a sheet-shaped precursor being overlaid on a base sheet.

As shown in FIG. 14, in the adding step, the sheet-shaped precursor 22A is pressed against the surface layer portion 21*a* in a state in which the sheet-shaped precursor 22A is overlaid on the surface layer portion 21*a*. In the present embodiment, a roller (not shown) is used to press the sheet-shaped precursor 22A against the surface layer portion 21*a*.

After the adding step is performed, the calcining step is performed in the same manner as in the first embodiment.

The present embodiment has the following advantages.

(2-1) The method for manufacturing the gas diffusion layer 20 includes the sheet forming step for forming the precursor 22A into a sheet-shaped precursor. In the adding step, the sheet-shaped precursor 22A is pressed against the surface layer portion 21*a* in a state in which the sheet-shaped precursor 22A is overlaid on the surface layer portion 21*a*.

With this method, the precursor 22A having a uniform thickness is readily added to the surface layer portion 21*a* of the porous base sheet 21 so as to fill the pores in the surface layer portion 21*a*.

(2-2) Since the porous carbon 22 has a structure in which hollow wire-shaped crystals are entangled, the microporous layer 23 can be readily formed into a thin film. Forming the microporous layer 23 into a thin film reduces the resistance overvoltage of the microporous layer 23.

Third Embodiment

A third embodiment will now be described with reference to FIGS. 15 and 16.

Figure 15:
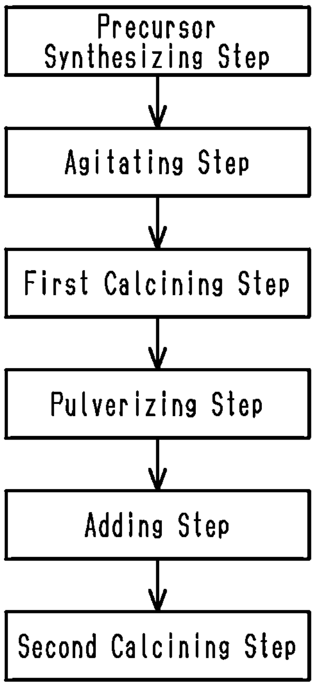
FIG. 15 is a flowchart showing a manufacturing procedure of a gas diffusion layer according to a third embodiment.

As shown in FIG. 15, the method for manufacturing the gas diffusion layer 20 of the present embodiment includes a precursor synthesizing step, an agitating step, a first calcining step, a pulverizing step, an adding step, and a second calcining step.

The precursor synthesizing step and the agitating step are the same as those in the first and second embodiments.

The first calcining step is a step for calcining a precursor in a range of 1000° C. to 1200° C. to grow multilayer cavity walls of graphene and thermally remove copper so as to form a porous carbon 22.

The first calcining step is preferably performed under a pressure lower than normal pressure.

The first calcining step is same as the calcining step according to the first embodiment in that copper is sublimated and removed by calcining the precursor 22A in a range of 1000° C. to 1200° C.

The pulverizing step is a step for pulverizing the porous carbon 22 while maintaining the crystal structure.

Figure 16:
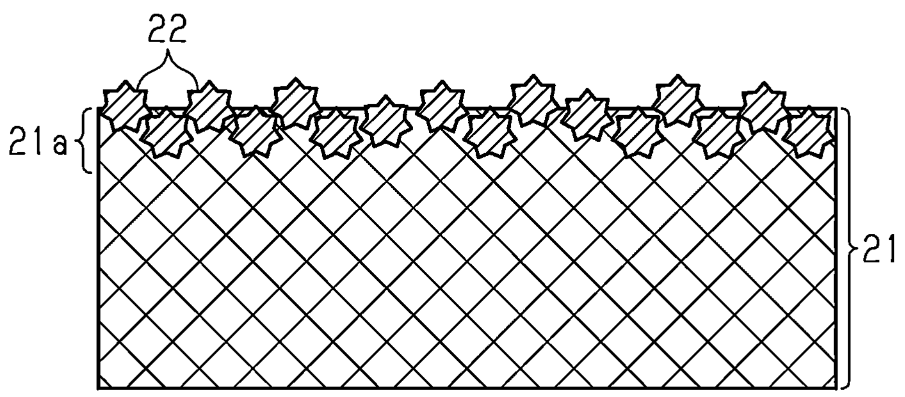
FIG. 16 is a schematic diagram showing a base sheet to which a solution containing pulverized porous carbon has been applied.

As shown in FIG. 16, the adding step is a step for adding the porous carbon 22 to a surface layer portion 21*a* of a porous base sheet 21 by applying or spraying a solution containing the pulverized porous carbon 22 to the surface layer portion 21*a*, thereby filling pores in the surface layer portion 21*a*. In the present embodiment, a phenol resin solution containing the pulverized porous carbon 22 is applied to the surface layer portion 21*a* of the base sheet 21, so that the solution penetrates into the pores in the surface layer portion 21*a* of the base sheet 21.

The second calcining step is a step for calcining the base sheet 21 and the porous carbon 22 to integrate the porous carbon 22 with the base sheet 21.

The present embodiment has the following advantages.

(3-1) The method for manufacturing the gas diffusion layer 20 includes the agitating step, the first calcining step, the pulverizing step, the adding step, and the second calcining step.

With the above-described method, since the calcining temperature of the first calcining step is a range of 1000° C. to 1200° C., the calcining temperature is lowered as compared with, for example, a conventional manufacturing method in which silver methylacetylide is calcined at 2000° C. This allows the size of the calcining furnace and the energy required for calcination to be reduced.

In addition, copper is preferable to silver in order to grow thick multilayer cavity walls of graphene so as to increase conductivity.

Accordingly, the above-described method enables the acquisition of the gas diffusion layer 20, in which the pores of the surface layer portion 21*a* of the base sheet 21 are filled with the porous carbon 22, through simple steps. The porous carbon 22 functions as a microporous layer 23. Therefore, the gas diffusion layer 20 having the microporous layer 23 can be manufactured by a simple method.

Modifications

The above-described embodiments may be modified as follows. The above-described embodiments and the following modifications can be combined if the combined modifications remain technically consistent with each other.

The fiber diameters of the carbon fibers forming the base sheet 21 and the sizes of the pores in the base sheet 21 can be changed.

The base sheet 21 is not limited to carbon cloth, and may be carbon paper or carbon nonwoven fabric.

In the first and second embodiments, copper methylacetylide as a precursor is added to the surface layer portion 21*a* of the base sheet 21 in the adding step. Thereafter, in the calcining step, the base sheet 21 and the precursor are calcined in a range of 1000° C. to 1200° C. Alternatively, copper methylacetylide as a precursor may be added to the surface layer portion of a base sheet precursor in the adding step. Thereafter, the base sheet precursor and the precursor may be calcined in a range of 1000° C. to 1200° C. in the calcining step. The base sheet precursor may be any type as long as it becomes a base sheet by being calcined, and is preferably, for example, a nonwoven fabric or paper made of polyacrylonitrile. Further, nonwoven fabric or paper made of cellulose may be used. In this case, the base sheet precursor is calcined to form a base sheet. Therefore, when the precursor is calcined, the base sheet precursor is calcined at the same time to form carbon paper or carbon nonwoven fabric as the base sheet.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A method for manufacturing a gas diffusion layer for a fuel cell, the method comprising:

agitating a solution containing copper methylacetylide as a precursor to form wire-shaped structures of the precursor and entangle the wire-shaped structures in the solution;

adding the precursor to a surface layer portion of a porous base sheet or a base sheet precursor so as to fill pores in the surface layer portion; and calcining the base sheet or the base sheet precursor and the precursor in a range of 1000° C. to 1200° C. to grow multilayer cavity walls of graphene and thermally remove copper, thereby forming a porous carbon that is composed of multilayer cavity walls of graphene and has mesoporosity and a hollow wire-shaped crystal structure.

2. The method for manufacturing a gas diffusion layer for a fuel cell according to claim 1, wherein the adding the precursor includes adding the precursor to the surface layer portion by applying or spraying the solution containing the precursor to the surface layer portion.

3. The method for manufacturing a gas diffusion layer for a fuel cell according to claim 1, further comprising forming the precursor into a sheet-shaped precursor, wherein the adding the precursor includes pressing the sheet-shaped precursor against the surface layer portion while the sheet-shaped precursor is overlaid on the surface layer portion.

4. A method for manufacturing a gas diffusion layer for a fuel cell, the method comprising:

agitating a solution containing copper methylacetylide as a precursor to form wire-shaped structures of the precursor and entangle the wire-shaped structures in the solution;

calcining the precursor in a range of 1000° C. to 1200° C. to grow multilayer cavity walls of graphene and thermally remove copper, thereby forming a porous carbon that is composed of multilayer cavity walls of graphene and has mesoporosity and a hollow wire-shaped crystal structure;

pulverizing the porous carbon while maintaining the crystal structure;

adding the porous carbon to a surface layer portion of a porous base sheet by applying or spraying a solution containing the pulverized porous carbon to the surface layer portion, thereby filling pores in the surface layer portion; and calcining the base sheet and the porous carbon to integrate the porous carbon with the base sheet.

5. A gas diffusion layer for a fuel cell, comprising:

a porous base sheet; and a porous carbon that is integrally formed with the base sheet so as to fill pores in a surface layer portion of the base sheet, wherein the porous carbon is composed of multilayer cavity walls of graphene and includes a structure in which hollow wire-shaped crystals having mesoporosity are entangled, wire diameters of the crystals are in a range of 100 nm to 500 nm, and diameters of pores formed by the entangled crystals are in a range of 10 nm to 200 nm.

* * * * *